United States Patent
Lefebvre et al.

(10) Patent No.: US 9,304,772 B2
(45) Date of Patent: Apr. 5, 2016

(54) ORDERING THREAD WAVEFRONTS INSTRUCTION OPERATIONS BASED ON WAVEFRONT PRIORITY, OPERATION COUNTER, AND ORDERING SCHEME

(75) Inventors: Laurent Lefebvre, Mascouche (CA); Michael Mantor, Orlando, FL (US)

(73) Assignees: Advanced Micro Devices, Inc., Sunnyvale, CA (US); ATI Technologies ULC, Markham (ON) (CA)

(*) Notice: Subject to any disclaimer, the term of this patent is extended or adjusted under 35 U.S.C. 154(b) by 715 days.

(21) Appl. No.: 13/433,939

(22) Filed: Mar. 29, 2012

(65) Prior Publication Data

US 2013/0262834 A1  Oct. 3, 2013

(51) Int. Cl.
*G06F 9/38* (2006.01)
*G06F 9/30* (2006.01)

(52) U.S. Cl.
CPC .. *G06F 9/38* (2013.01); *G06F 9/30* (2013.01); *G06F 9/3836* (2013.01); *G06F 9/3851* (2013.01); *G06F 9/3885* (2013.01); *G06F 9/3887* (2013.01)

(58) Field of Classification Search
CPC ..... G06F 9/3851; G06F 9/52; G06F 9/30087; G06F 9/3838; G06F 9/46; G06F 9/526; G06F 9/3834; G06F 9/5038
See application file for complete search history.

(56) References Cited

U.S. PATENT DOCUMENTS

| 7,533,236 | B1 | 5/2009 | Nordquist |
| 7,752,413 | B2 | 7/2010 | Hoover et al. |
| 2005/0166032 | A1 | 7/2005 | Noeske et al. |
| 2011/0055511 | A1 | 3/2011 | Mantor et al. |
| 2013/0262812 | A1 | 10/2013 | Lefebvre et al. |

OTHER PUBLICATIONS

U.S. Appl. No. 13/433,901, Lefebvre et al., "Hardware Managed Allocation and Deallocation Evaluation Circuit," filed Mar. 29, 2012.
International Search Report directed to related International Application No. PCT/US2013/033157, mailed on Jul. 10, 2013; 3 pages.
Written Opinion directed to related International Application No. PCT/US2013/033157, mailed on Jul. 10, 2013; 4 pages.
Non-Final Rejection mailed Feb. 18, 2014 for U.S. Appl. No. 13/433,901, filed Mar. 29, 2012; 9 pages.

*Primary Examiner* — Kenneth Kim
(74) *Attorney, Agent, or Firm* — Volpe and Koenig, P.C.

(57) ABSTRACT

A system and method is provided for improving efficiency, power, and bandwidth consumption in parallel processing. Rather than requiring memory polling to ensure ordered execution of processes or threads in wavefronts, the techniques disclosed herein provide a system and method to allow any process or thread in a wavefront to run out of order as long as needed, but ensure ordered execution of multiple ordered instructions when needed. These operations are handled efficiently in hardware, but are flexible enough to be implemented in all manner of programming models.

17 Claims, 5 Drawing Sheets

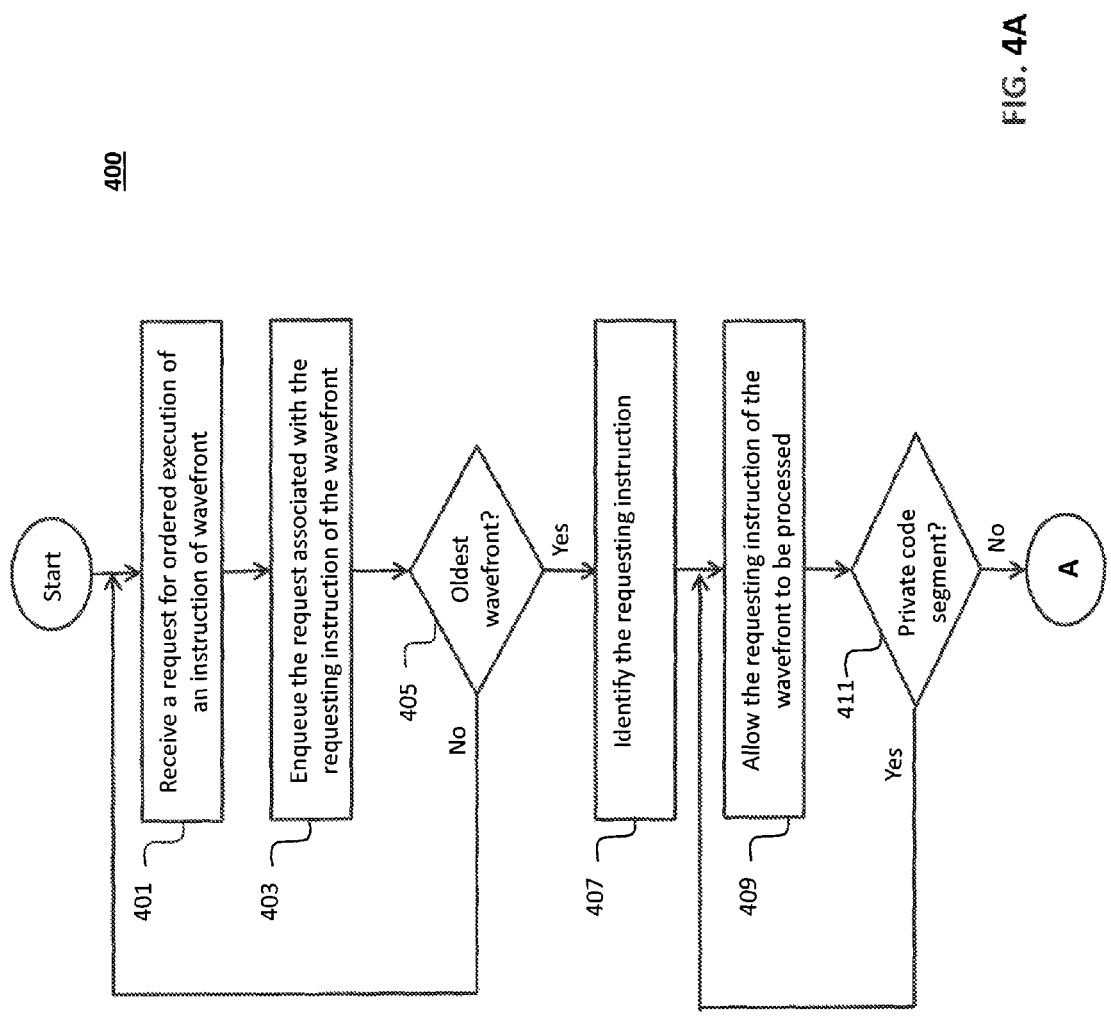

ORDERING THREAD WAVEFRONTS INSTRUCTION OPERATIONS BASED ON WAVEFRONT PRIORITY, OPERATION COUNTER, AND ORDERING SCHEME

BACKGROUND

1. Field of the Invention

The present invention relates generally to parallel processing and, more particularly, to ordered execution for parallel processing devices.

2. Related Art

Processing units are capable of executing processes or threads without regard to the order in which the processes or threads are dispatched. The out of order execution of processes or threads gives the processing units the ability to better utilize the latency hiding resources, to increase their efficiency, and to improve their power and bandwidth consumption.

However, in some cases, it is preferred that some processes or threads be executed in order. The processes or threads that require ordered operation/execution can include processes or threads for accessing memory or any other forms of processes or threads. One example where the execution of ordered processes or threads is preferred is when the processes or threads are writing data in an ordered buffer memory, however, the amount of data that each process, thread, or the like (hereinafter referred to as process for convenience, but not limitation) is writing is not fixed. In order to correctly execute these processes or threads, a particular process needs to make sure that all of the processes or threads that were supposed to write their data in the memory before this particular process have done so before this particular process can be executed.

Ordered execution of processes or threads can be performed using memory polling. In this method, every process polls the memory at every given location. A process runs if a value in the memory corresponds to its identification. However, memory polling is a power and memory intensive operation because it requires reading the memory over and over again and there is no guarantee if or when the process will run.

SUMMARY OF EMBODIMENTS

Therefore, what is needed is a system and method that allows processes to run out of order except when one or more of the processes requires ordered operations. What is also or alternatively desired is a technique to remove memory polling.

For example, when requiring ordered operations, a circuit places the ordered process into a sleep mode until the ordered process is the oldest process so the ordered process can be processed in a particular order.

As another example, ordered processes are placed in sleep mode until the processes are ready for ordered operation without any intervention from processing units or changes to the program being run.

An embodiment of the present invention provides an apparatus including a scoreboard structure configured to store information associated with a plurality of wavefronts. The apparatus further includes a controller, comprising a plurality of counters, configured to control an order of operations, such that a next one of the plurality of wavefronts to be processed is determined based on the stored information and an ordering scheme.

Another embodiment of the present invention provides a method including storing information associated with a plurality of wavefronts at a scoreboard structure and controlling, using a controller comprising a plurality of counters, an order of operations, such that a next one of the plurality of wavefronts to be processed is determined based on the stored information and an ordering scheme.

Another embodiment of the present invention provides an article of manufacture including a computer-readable storage medium having instructions stored thereon, execution of which by a computing device causes the computing device to perform operations including storing information associated with a plurality of wavefronts at a scoreboard structure and controlling, using a controller comprising a plurality of counters, an order of operations, such that a next one of the plurality of wavefronts to be processed is determined based on the stored information and an ordering scheme.

Further features and advantages of the present invention, as well as the structure and operation of various embodiments of the present invention, are described in detail below with reference to the accompanying drawings. It is noted that the present invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the present invention and to enable a person skilled in the relevant art to make and use the present invention.

FIGS. 4A and 4B depict a flowchart (in two parts) illustrating multiple ordered instructions operation of processes or threads, in accordance with an embodiment of the present invention.

Figure 1:
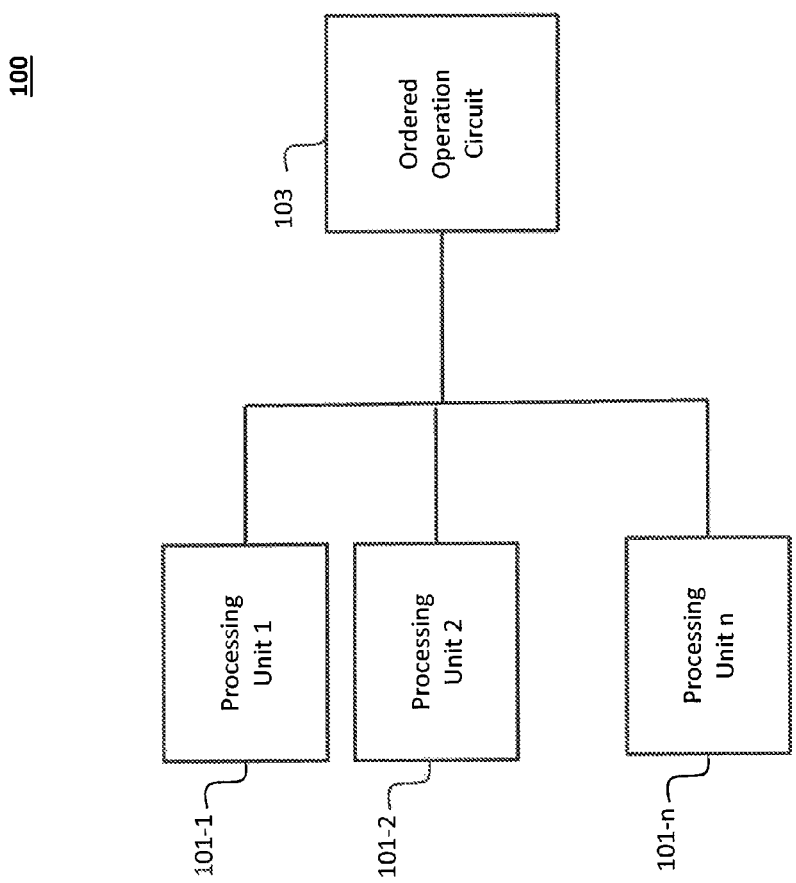
FIG. 1 illustrates a system or an apparatus that can be used for ordered operation of processes or threads, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following detailed description of the present invention refers to the accompanying drawings that illustrate exemplary embodiments consistent with this present invention. Other embodiments are possible, and modifications can be made to the embodiments within the spirit and scope of the present invention. Therefore, the detailed description is not meant to limit the present invention. Rather, the scope of the present invention is defined by the appended claims.

It would be apparent to one of skill in the art that aspects of the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Additionally, and as will be apparent to one of ordinary skill in the art, the simulation, synthesis and/or manufacture of the various embodiments of this present invention may be accomplished, in part, through the use of computer readable code (as noted above), including general programming languages (such as C or C++), hardware description languages (HDL) including Verilog HDL, VHDL, Altera HDL (AHDL) and so on, or other available programming and/or schematic capture tools (such as circuit capture tools). This computer readable code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and internets. It is understood that the functions accomplished and/or structure provided by the systems and techniques described above can be represented in a core (such as a graphics processing unit (GPU) core) that is embodied in program code and may be transformed to hardware as part of the production of integrated circuits. As will be appreciated, other types of cores or processing units can provide the functions and/or structure embodying aspects of the present invention. These processing units may include, for example, central processing units (CPUs), the aforementioned graphics processing units, digital signal processors, application processors and the like.

Reference to modules in this specification and the claims means any combination of hardware or software components for performing the indicated function. A module need not be a rigidly defined entity, such that several modules may overlap hardware and software components in functionality. For example, a software module may refer to a single line of code within a procedure, the procedure itself being a separate software module. One skilled in the relevant arts will understand that the functionality of modules may be defined in accordance with a number of stylistic or performance-optimizing techniques, for example.

FIG. 1 illustrates a system 100, according to an embodiment of the present invention. In this example, the system or apparatus 100 includes, but is not limited to, one or more processing units 101-1-101-n (collectively processing units 101) and an ordered operation circuit/apparatus (OOC) 103.

Although three processing units 101 are illustrated in FIG. 1, it is expected that the system 100 can include one or more processing units.

In one example, processing units 101 launch wavefronts that include a group of processes, threads, instructions, or the like (hereinafter, as noted above, referred to as processes for convenience and not limitation), and execute the individual processes. In various examples, the individual processes may either allow for out of order execution or may require ordered execution. When ordered execution is required for a particular process, OCC 103 is notified of this requirement via a request from the respective processing unit 101. OCC 103 then controls the timing when the process is executed. Thus, in this example, OOC 103 controls timing of which process is operated on by which processing unit 101 at what time based on receiving requests from the various processing units 101.

An example OOC is disclosed in U.S. patent application Ser. No. 12/553,652, filed Sep. 3, 2009, titled "Interlocked Increment Memory Allocation and Access," which is incorporated by reference herein in its entirety. In addition to the operations of the exemplary OOC disclosed in U.S. patent application Ser. No. 12/553,652, OOC 103 disclosed in this application is configured to control an order of the operations being performed in processing units 101, such that system 100 and OOC 103 are capable of performing multiple ordered operations for each wavefront.

In one embodiment, processing units 101 and OOC 103 are formed on a single silicon die or package. However, it is not a requirement that processing units 101 and OOC 103 be formed on a single silicon die.

In one example, processing units execute instructions at their own pace independent from other processing units. This independence of processing units 101 can allow for the out of order execution of processes.

In an example operation, when a processing unit 101-1 wants to perform a chosen process as an ordered operation, processing unit 101-1 sends a request for the ordered operation to the OOC 103. The OOC 103 receives the request for the chosen process and/or information associated with the chosen process and stores (e.g., enqueues) the request or information in a scoreboard structure (e.g., scoreboard structure 301 of FIG. 3). In one example, a scoreboard structure holds a set of wavefront records and is, e.g., a queue or other data structure implemented in registers or other memory. After sending the request, processing unit 101-1 places the chosen process in a sleep mode (e.g., disabled or not executed). The chosen process is not and will be enabled for execution until OOC 103 determines the chosen process is the oldest process with respect to an ordering scheme that is administrated by OOC 103. However, processing unit 101-1 continues to operate on processes that do not require ordered operations.

In one example, OOC 103 processes the request based on an ordering scheme. For example, the ordering scheme is based on an identification (ID) that has been assigned to each of the processes. The ID can be based on the age of the processes or can be user or application generated. For example, system 100 can include a counter (not shown) such that a specific time of receipt of the process at system 100 for execution can be used as the ID for that particular process. Another example for assigning IDs is based on their prioritization, as long as the IDs are consecutive and there are no gaps in the IDs (the set of IDs are consecutive with no gaps). If the OOC 103 detects a gap in the set of IDs, the OOC 103 will stall its process of assigning IDs. In other examples, the IDs can also be generated by any counter, memory, or other device in system 100.

In one example, OOC 103 is configured to control an order of the operations being performed in processing units 101, such that system 100 and OOC 103 are capable of performing multiple ordered operations for each wavefront. In this embodiment, the processing units 101 request multiple ordered operations (e.g., multiple ordered instructions) be performed for each of their wavefronts. OOC 103 receives multiple ordered operation requests for each wavefront from processing units 101 and stores (e.g., enqueues) the requests or information corresponding to the wavefronts based on the wavefronts' IDs and the number of the ordered operation. In one example, OOC 103 includes multiple counters and/or pointers. Information corresponding to each of the ordered operations of the multiple ordered operations is stored (e.g., enqueued) based on its corresponding counter/pointer. By including multiple counters and/or pointers, OOC is able to perform multiple ordered operations for each of wavefronts. Additionally, or alternatively, additional logic and/or hardware for OOC 103 such as additional counters, pointers, up/down counters, restructuring of a scoreboard structure, and/or use of additional information associated with the wavefronts, can be used to allow for the multiple ordered operation.

In one example, OOC 103 is configured to initialize the operation of an oldest wavefront. Accordingly, when OOC 103 recognizes that a wavefront is the oldest wavefront, OOC 103 dequeues the wavefronts to be executed. OOC 103 next determines whether a next ordered operation has been stored for the same wavefront. If a next ordered operation has been stored for the same wavefront, OOC 103 will initiate execution of the ordered operation. Otherwise, OOC 103 will move to the next oldest wavefront that has been stored.

By way of non-limiting example, and for illustration purposes only, an example operation of OOC 103 is discussed. In this example, two ordered instructions and four wavefronts run concurrently with the following execution order:

Wave1OA1+!done+release

Wave0OA1+!done+release

Wave2OA1+!done+release

Wave0OA2+done+release

Wave3OA1+!done+release

Wave2OA2+done+release

Wave1OA2+done+release

Wave3OA2+done+release

In this example, OA=Ordered Append instruction, done=a control bit indicating whether the ordered instructions for that particular wavefront are over. If the done bit is set, it indicates that the ordered instructions for that wavefront is done, and release=a control bit indicating whether the system can move to another wavefront or needs to stay with this current wavefront. If the release bit is not set, it indicates that the system has to continue execution of that instruction and any subsequent ones without any order wavefronts executing at the same time until told using another ordered instruction with the release bit set. In the case such private code segment (discussed in detail below), both done and release bits are not set.

In this example, OOC 103 receives a request for an ordered operation with respect to Wave1 OA1 and/or information associated with this instruction that requests an ordered operation. OOC 103 stores the request for Wave1 OA1 and/or the information and instructs that Wave1 OA1 is put into sleep mode until Wave1 OA1 is the oldest operation.

When OCC 103 receives a request for ordered operation of Wave0 OA1 and/or information associated with this instruction, OOC 103 stores the request. Since this request is the oldest request, OOC dequeues the request for further process. OOC 103 increases a value of a first counter that is associated with the first ordered operation of the wavefronts. When a new value of the first counter points to Wave1 OA1, which was previously stored and put into sleep mode, OOC 103 will dequeue the request associated with Wave1 OA1, such that Wave1 OA1 is processed. OOC 103 then increases the value of the first counter.

Next, OOC 103 receives a request regarding Wave2 OA1 and controls storing of Wave2 OA1. When the first counter points to the stored Wave2 OA1, OOC 103 controls dequeuing of the request associated with Wave2 OA1, allowing the operation of Wave2 OA1. OOC 103 then increases the value of the first counter.

Similarly, when OOC 103 receives a request regarding Wave0 OA2 (which is the second ordered operation/instruction of Wave0), OOC 103 controls storing of the request associated with Wave0 OA2 with respect to a second counter. Wave0 is the oldest wavefront, therefore, the request associated with Wave0 OA2 is dequeued and proceeds to be processed. After which the value of the second counter is increased.

Figure 3:
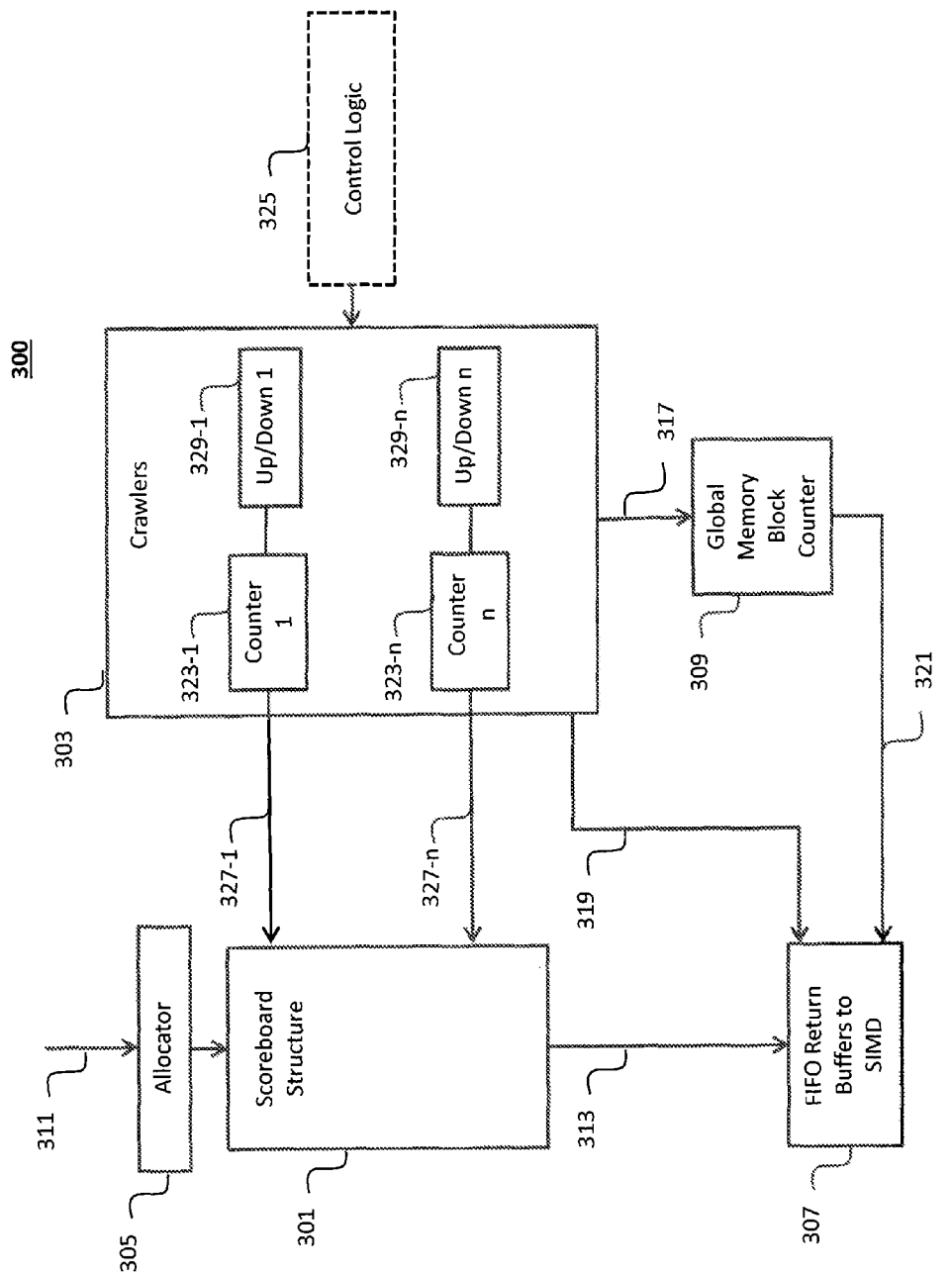
FIG. 3 illustrates ordered operation apparatus for multiple ordered instructions operation, in accordance with an embodiment of the present invention.

Similar operation of OOC 103 is continued for the remaining ordered operations of other wavefronts, as discussed in more detail with respect to FIG. 3.

In one example, system 100 can be or include a graphics processor unit (GPU). Additionally or alternatively, the processing units 101-1 can be one or more single instruction multiple data (SIMD) processing units, each of which capable of executing an increasingly large number of threads.

Figure 2:
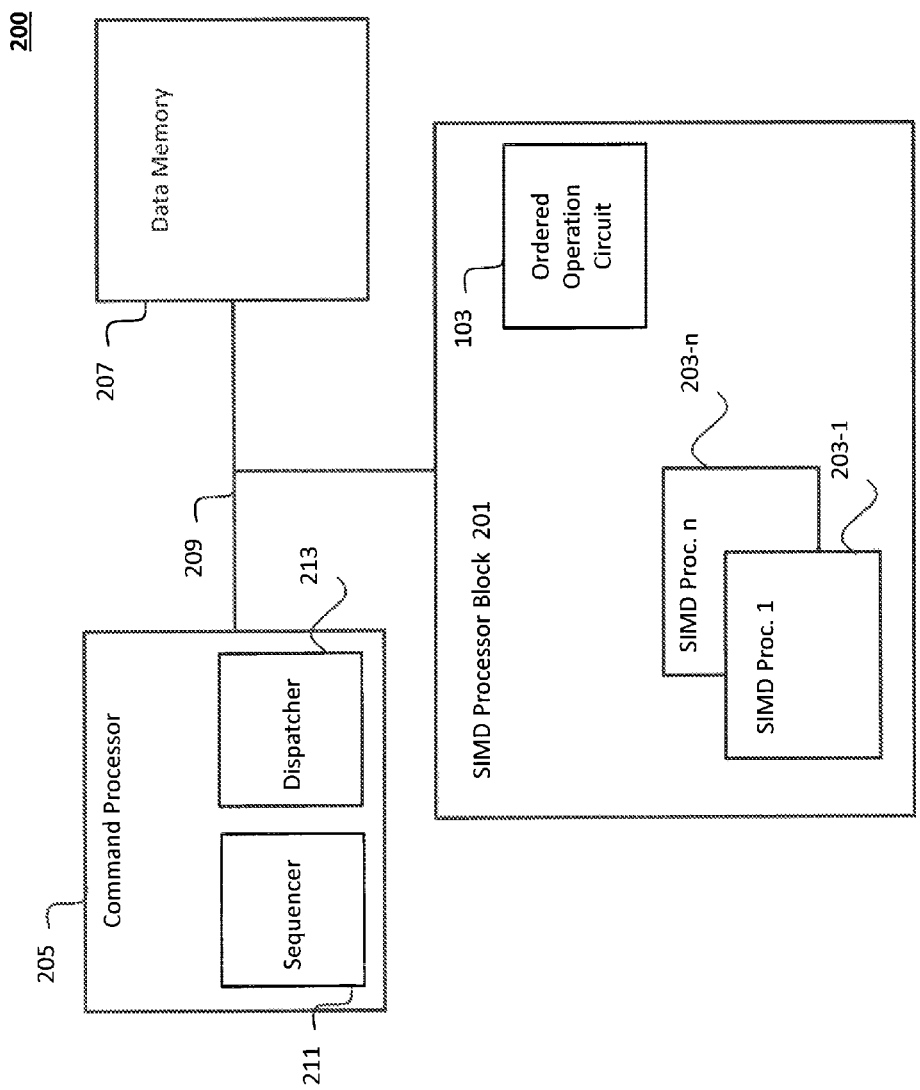
FIG. 2 illustrates ordered operation of processes or thread on a GPU, in accordance with an embodiment of the present invention.

FIG. 2 illustrates an implementation using a GPU 200, according to an embodiment of the present invention. In this example, GPU 200 includes, but is not limited to, a SIMD processor block 201, a command processor 205, a data memory 207, and a communication infrastructure 209. In one embodiment, GPU 200 is communicatively connected to a central processing unit (CPU) (not shown) to process various tasks, e.g., graphics processing and other tasks related to parallel processing. In another embodiment, GPU 200 can be a general purpose GPU (GPGPU) either performing a multitude of different tasks as a co-processor of a CPU, or performing the functions of the CPU.

In one example, SIMD processor block 201 includes one or more processing units, such as SIMD processors 203-1 and 203-n. SIMD processor block 201 includes the functionality to perform various processing tasks on GPU 200. In an example where more than one SIMD is used, each SIMD processor 203-1 and 203-n is configured to execute one or more concurrent threads, each thread performing a part of the processing for one or more tasks assigned to the SIMD processing block 201.

For example, in an application rendering images to a display screen, each SIMD processor 203-1 and 203-n may execute multiple threads so that pixels of the image being rendered can be processed concurrently. In executing a stream of instructions, the SIMD processors 203-1 and 203-n can execute one or more threads concurrently to process application data. For purpose of clarity, the following description considers a wavefront as a group of threads executing on a single processing unit, such as SIMD processor 203-1.

In one example, command processor 205 includes the functionality to coordinate the functions of GPU 200. For example, command processor 205 can receive instructions from a CPU (not shown) and issue corresponding instructions for processing by processors in SIMD processor block 201. In an embodiment of the present invention, command processor 205 can include a sequencer 211 and/or a dispatcher 213. Sequencer 211 may include the functionality to coordinate read/write conflicts between wavefronts. For example, sequencer 211 can ensure that a wavefront to read certain data is not launched until a wavefront producing (i.e., writing) that data has completed operation. In one example, dispatcher 213 may include the functionality to launch one or more wavefronts on one or more corresponding SIMD processors. For example, an application instruction received from the CPU can cause command processor 205 to schedule numerous threads to render an image by processing pixels of the image in parallel. The dispatcher 213 may include functionality to determine how the threads can be grouped into wavefronts such that, for example, each wavefront executes on a separate SIMD processor.

Sequence 211 and/or dispatcher 213 can also include the functionality to coordinate wavefronts between different SIMD processors 203 and/or OOC 103. For example, sequencer 211 and/or dispatcher 213 can determine onto which SIMD processor the wavefronts are launched. In one example, sequencer 211 and/or dispatcher 213 may determine that a wavefront and/or an instruction of a wavefront requests ordered operation. According to this example, sequencer 211 and/or dispatcher 213 may forward the wavefront requesting ordered operation, the instruction of the wavefront requesting ordered operation, and/or information associated with them to OOC 103 such that they can be processed based on an ordering scheme.

According to one example, command processor 205 can produce a logical wave ID to be used for identification purposes of the wavefronts. In this example, the logical wave ID can be used by the OOC 103 for ordered operation of the wavefronts.

In one example, data memory 207 can include one or more memory components for use by threads executing in SIMD processor block 201. For example, data memory 207 can include one or more of graphics memory, frame buffer memory, or other memory local to SIMD processor block 201. In yet another embodiment, data memory 207 can include system memory.

According to one example, the GPU 200 can include a plurality of SIMD processor blocks (such as processor block 201) with one OOC (such as OOC 103) per each of the SIMD processor blocks. According to this example, the plurality of SIMD processor blocks can include one or more compute and/or one or more pixel blocks. In this example, each of the compute blocks require one crawler. Alternatively or additionally, each of the pixel blocks requires multiple crawlers. When working with pixels, scan converter generates pixels. In order to have higher bandwidth, a plurality of scan converters are used. Each scan converter is responsible for generating the ID for the wavefronts. The system is configured to ensure that the IDs are generated correctly for each scan converter. Therefore, the pixel blocks include a plurality of rings with one pointer for each ring and require multiple crawlers. In one example, the number of the crawlers needed is equal to the number of scan converters since order can be maintained per scan converter and not across all the pixels that are generated.

Although, this example is in accordance with GPU 200, it should be apparent that the teachings of this disclosure are applicable to many other types of processors and processing. For example, an embodiment of the present invention is a multi-processor computer having parallel executing processes for different processing task or application. However, the teachings of this disclosure can be used with particularly advantage in processing environments having a large number of concurrently executing threads.

FIG. 3 illustrates an OOC 300, according to one embodiment of the present invention. For example, OOC 300 is configured for multiple ordered operations for each wavefront. In one example, apparatus 300 includes a scoreboard structure 301, crawlers 303, an allocator 305, FIFO (first in first out) return buffers 307 (although one is shown), and a global memory block counter 309.

Crawlers 303 include a plurality of counters and/or pointers 323-1-323-n (collectively counters 323) and a plurality of up/down counters 329-1-329-n (collectively up/down counters 329). The counters 323-1-323-n can interact with scoreboard structure 301 using the interfaces 327-1-327-n. OOC 300 further includes an optional control logic 325, which may be used to perform the logic of crawlers 303. In this example, crawlers 303 include counters and/or pointers 323 and control logic 325 is connected to crawlers 303.

It is to be appreciated that the relationship between the crawlers, counters/pointers, up/down counters, and the control logic is implementation dependent and different combinations can be used.

As discussed above, in one example, scoreboard structure 301 holds a set of wavefront records. Scoreboard structure 301 can be a queue or other data structure implemented in registers or other memory. The scoreboard structure 301 may have pre-allocated slots for wavefront records corresponding to an ordering scheme such as, but not limited to, launch identifier.

In one example operation, requests for multiple ordered operation of wavefronts are received by OOC 300 on an interface 311 (interface may also be understood to mean, e.g., a path, a trace, etc.) from, for example, the processing units 101 of FIG. 1, the SIMD processors 203-1 and 203-n (collectively SIMD processors 203—FIG. 2), and/or the command processor 205 of FIG. 2. In one example, allocator 305 determines an appropriate location in the scoreboard structure 301 for the incoming request and stores the request in the determined slot. The wavefront record corresponding to the stored entry can include wavefront information, such as wavefront identifier, SIMD processors on which it is executing, a launch identifier that represents the sequence in which the wavefront was launched by the command processor, information indicating whether a last one of ordered instruction of the wavefront is reached, etc.

In one exemplary embodiment, scoreboard structure 301 can hold the maximum number of threads that are available in system (e.g., system 200). In one example, scoreboard structure 301 can hold 1280 bits. However, it is apparent the present invention is not limited to any value.

In one example, crawlers 303, alone and/or in combination with control logic 325, continuously monitor scoreboard structure 301. In one embodiment, crawlers 303 monitor each ordered slot in scoreboard structure 301 in sequence until a valid wavefront record is stored to that slot. A wavefront record is valid when any conflicts, such as read/write memory conflicts, related to the memory allocation have been resolved. In one example, the validity of the wavefront record can be indicated by setting a bit in scoreboard structure 301.

Interfaces 327-1-327-n between crawlers 303 and scoreboard structure 301 can allow for the monitoring and selection of wavefront records by crawlers 303. Another interface 317 can allow for crawlers 303 to provide the selected wavefront, or more particularly an identifier such as a corresponding wavefront launch identifier, to update global memory block counter 309. In one example, global memory block counter 309 can be implemented using a register or memory accessible to the SIMD processors. Global memory block counter 309 includes functionality to allow atomic access for wavefront operations.

In one example, the number of counters 323 depends on the number of ordered instructions for each wavefront. For example, crawlers 303 monitor and/or track the ordered slots in scoreboard structure 301 associated with counter 323-1 until a valid wavefront record of the first ordered instruction is stored to that slot and crawlers 303 monitor and/or track the ordered slots in scoreboard structure 301 associated with counter 323-n until a valid wavefront record of the $n^{th}$ ordered instruction is stored to that slot. In one example, scoreboard 301 includes information associated with the wavefronts, such as information regarding the validity of the wavefronts. In one example, the validity of the wavefront record can be indicated by setting a bit in scoreboard structure 301. Further, additional control bits can be used in crawlers 303, scoreboard structure 301, ordered operation request, wavefront records, or a combination of thereof, to further control the operation of the crawlers. For example, a control bit can be used to indicate whether an ordered instruction is the only and/or the last ordered instruction for a wavefront. Additionally or alternatively, a control bit can be used to indicate whether a wavefront represents a private code segment, such that that wavefront should be executed until further notice. According to one example, control logic 305 in combination with crawler 303 and counters 323 can control the ordered operation of ordered operation apparatus 300.

In order to better describe the relationship between the counters 323 and their up/down counters 329-1-329-n (collectively up-down counters 329), the example disclosed above is used. This relationship is illustrated according to the system that includes two ordered instructions and four wavefronts running concurrently with the following given (but random) execution order:

Wave1OA1+!done+release

Wave0OA1+!done+release

Wave2OA1+!done+release

Wave0OA2+done+release

Wave3OA1+!done+release

Wave2OA2+done+release

Wave1OA2+done+release

Wave3OA2+done+release

For this example, crawlers 303 of FIG. 3 include two counters 323 (namely counter/pointer 323-1 and counter/pointer 323-2) because of two ordered instructions. Further, in this example, counter 303-1 includes an up/down counter 329-1 and counter 303-2 includes an up/down counter 329-2.

According to this example, during the operation, OOC 300 receives a request for an ordered operation with respect to Wave1 OA1. OCC 300 stores the request in scoreboard structure 301. Wave1 OA1 is placed into a sleep mode, as it is not the oldest wavefront. No change to the values of counters 323 and/or up/down counters 329 is made. According to this example, counter 323-1 is used to track and/or monitor the first ordered instruction of wavefronts 0, 1, 2, and 3 and counter 323-2 is used to track and/or monitor the second ordered instruction of wavefronts 0, 1, 2, and 3.

Wave0 will issue its first ordered operation/instruction, (OA1). OOC 300 receives a request associated with Wave0 OA1 and stores the request in scoreboard structure 301 according to, for example, the wavefront's ID. If Wave0 OA1 is a valid instruction (e.g., a valid bit associated with Wave0 OA1 is set) and also the up/down counter 329-1 has a value !-MAX_WAVE+1 (e.g., the maximum number of wavefronts in the system to prevent it to wrap when the system is full), the request associated with Wave0 OA1 is dequeued to proceed for further process as Wave0 OA1 is the oldest wavefront. In this example, first counter/pointer 323-1 is active if the value of its associated up/down counter 329-1 is not equal to number of maximum wavefronts in system plus one. The other counter/pointers (e.g., counter 323-2) are active if the values of their associated up/down counters (e.g., up/down counter 329-1) is greater than zero.

Accordingly, the value of counter 323-1 is incremented such that counter 323-1 will point to the request associated with Wave1 OA1, which was previously received. Also, the values of up/down counters 329-1 and 329-2 are incremented. According to one example, up/down counters 329 are initialized to value zero before the operation of OOC 300 begins. Therefore, in this example, after the request associated with Wave0 OA1 is dequeued, up/down counter 329-1=1 and up/down counter 329-2=1.

Counter 323-1 now points to the request associated with Wave1 OA1 (e.g., the current oldest wavefront in scoreboard 301). If Wave1 OA1 is valid and up/down counter 392-1 has a value more than 0, the request associated with Wave1 OA1 is dequeued and proceeds to be processed. Accordingly, counter 323-1 is incremented to point to the next slot in scoreboard structure 301 and the values of up/down counters are incremented (e.g., up/down counter 329-12 and up/down counter 329-2=2).

Wave2 issues its first ordered instruction OA1. OOC 300 receives a request for an ordered operation with respect to Wave2 OA1 and stores the request based on the ordering scheme. Since Wave2 OA1 is the oldest wavefront in structure 301 (e.g., counter 323-1 points to it), if it includes a valid bit and up/down counter 329-1 has a value greater than 0, the request associated with Wave 2 OA1 is dequeued to proceed for further operation. Accordingly, counter 323-1 is incremented to point to the next slot in scoreboard structure 301 and the values of up/down counters are incremented (e.g., up/down counter 329-1=3 and up/down counter 329-2=3).

Continuing with this non-limiting example, Wave0 issues its second ordered instruction (OA2). OOC 300 receives the request associated with Wave0 OA2 and stores this request based on, for example, Wave0 ID. In this example, counter 323-2 points to the slot where the request associated with Wave0 OA2 is stored, as it is associated with the second ordered instruction. Since Wave0 is the oldest wavefront, the request associated with Wave0 OA2 is dequeued to proceed for further process. Accordingly, counter 323-2 is incremented to point to the next slot in scoreboard structure 301 associated with second ordered instruction. Also, since OA2 was the last ordered instruction of Wave0 (e.g., bit done was set) the values of up/down counters are decremented (e.g., up/down counter 329-1=2 and up/down counter 329-2=2).

Next, Wave3 issues its first ordered instruction (OA1). OOC 300 receives a request for an ordered operation with respect to Wave3 OA1, stores the request in structure 301, and further dequeues the request to proceed for processing since Wave3 is the oldest wavefront (e.g., counter 323-1 points to its stored slot in structure 301). Accordingly, counter 323-1 is incremented and the values of up/down counters are incremented (e.g., up/down counter 329-1=3 and up/down counter 329-2=3).

Further, Wave2 issues its second ordered instruction (OA2). OOC 300 receives a request for an ordered operation with respect to receives Wave2 OA2, stores the request in structure 301. Wave2 OA2 is placed into sleep mode since it is not the oldest wavefront (e.g., counter 323-2 does not point to its stored slot in structure 301—Wave1 OA2 has not been issued yet). No change to counters 323 and up/down counter 329 is made.

Next, Wave1 issues its second ordered instruction (OA2). OOC 300 receives a request for an ordered operation with respect to receives Wave1 OA2, stores the request in structure 301, and further dequeues the request to proceed for processing since Wave1 is the oldest wavefront (counter 323-2 points to its stored slot in structure 301). Accordingly, counter 323-2 is incremented and the values of up/down counters are decremented as it is the last ordered instruction of Wave1 (e.g., up/down counter 329-1=2 and up/down counter 329-2=2).

As counter 323-2 is incremented, it points to the request associated with Wave2 OA2, which was previously received. Therefore, Wave2 OA2 is the oldest instruction; the request associated with Wave2 OA2 is dequeued to proceed for processing. Accordingly, counter 323-2 is incremented and the values of up/down counters are decremented as it is the last ordered instruction of Wave0 (e.g., up/down counter 329-1=1 and up/down counter 329-2=1).

Lastly, Wave3 issues its second ordered instruction (OA2). OOC 300 receives a request for an ordered operation with respect to Wave3 OA2, stores the request in structure 301, and farther dequeues the request to proceed for processing since it is the oldest wavefront (counter 323-2 points to its stored slot in structure 301). Accordingly, counter 323-2 is incremented and the values of up/down counters are decremented as it is the last ordered instruction of Wave1 (e.g., up/down counter 329-1=0 and up/down counter 329-2=0).

Continuing with the description of the exemplary embodiment of FIG. 3, in one example, FIFO return buffers 307 store wavefront records, the request associated with the wavefront, and/or parts thereof, that are selected and/or dequeued from scoreboard structure 301. For example, the records can be stored according to an ordering that is determined by crawlers 303 as described above. The global memory block counter 309 can return the global memory block counter pre-operation value to the subject wavefront on a SIMD processor through buffers 307. An interface 321 between global memory block counter 309 and buffers 307 can be used for communicating a global memory block counter pre-operation value. Buffers 307 can be a first-in-first-out (FIFO) from which the wavefront records, or partial wavefront records, along with the corresponding global memory block counter pre-operation value, can be retrieved for processing by a SIMD processor. For example, wavefronts can obtain the global memory block counter pre-operation value through buffers 307. Interfaces 313 and 319, from scoreboard structure 301 and crawler 303 respectively, may enable the storing of selected wavefront records or partial wavefront records to buffers 307.

Figure 4B:
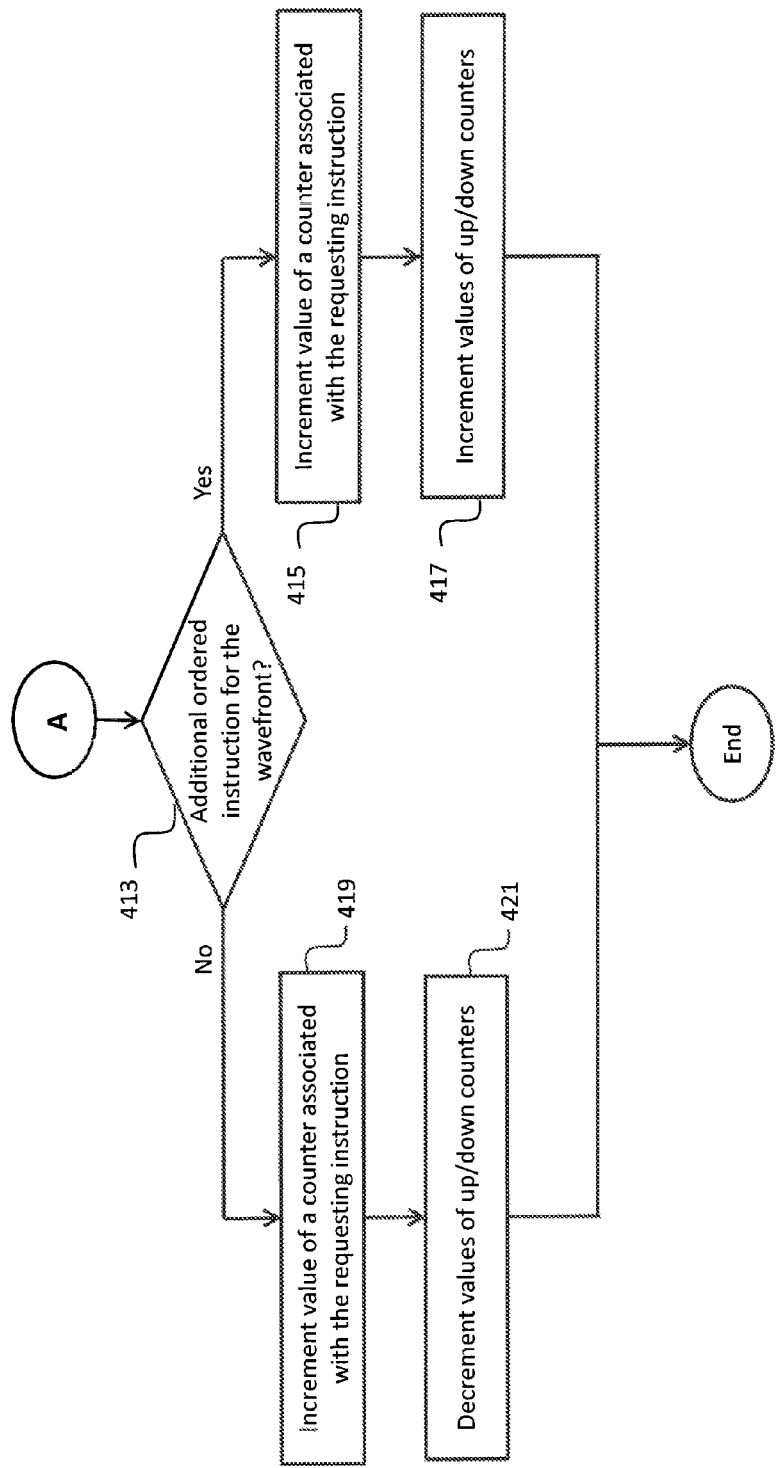

FIGS. 4A and 4B illustrate a flowchart 400 (in two parts), according to an embodiment of the present invention. For example, method 400 can be used when wavefronts require multiple operations according to a predetermined ordering. The processing steps of FIGS. 4A and 4B can be used, for example, by OOC 300 of FIG. 3. Thus, the description below will be in terms of OOC 300 for convenience, but not limitation. It is to be appreciated that the steps may not be performed in the order shown or require all the steps shown.

In step 401, a request is received for ordered operation. Additionally, an identifier of the wavefront requesting ordered operation is determined. As discussed before, such identifier can include, but is not limited to, launch identifier.

In step 403, the request is stored (e.g., enqueued) in, for example, structure 301 of FIG. 3. Structure 301 can hold the maximum number of wavefronts that can be concurrently executed in a SIMD processor block, e.g., SIMD processor 201 of FIG. 2. As discussed above, the request, wavefront records, and/or information associated with the request and/or the wavefront are stored (e.g., enqueued).

In step 405, the system recognizes when the ordered instruction of the next oldest expected wavefront is stored. As discussed before, each wavefront that is stored can be ordered according to a sequencing indicator, such as a launch identifier that represents the sequence in which the wavefronts were launched by the command processor. The identification of the oldest wavefront may be accomplished using one of many methods. In one embodiment, each wavefront is stored in a queuing structure in a slot corresponding to its respective launch ordering. To recognize when the next oldest expected wavefront stores, the corresponding slot in the queuing structure is monitored using, for example, a counter/pointer associated with that particular ordered instruction. When the next oldest is stored and then released for further processing, the monitoring associated with that particular ordered instruction of the released wavefront slips down to the next slot in sequence, and in this manner ensures the servicing of requests in some predetermined order such as the launch order.

In step 407, the ordered instruction of the next oldest expected wavefront is identified, the request, wavefront records, and/or information associated with the request and/or the wavefront is dequeued, and proceeds to further processing in step 409.

In step 411, an additional check is performed on the received request to determine whether the request is associated with a private code segment. If the request is associated with the private code segment, ordered operation apparatus 300 will only initiate execution of the instructions associated with this request and will not move to other wavefronts or other ordered instructions of the same wavefront. The execution of this private code segment is continued until a further notice is received at ordered operation apparatus 300 to move to other wavefronts and/or other ordered instructions of the same wavefront.

Steps 413-421 are performed so that the counters 323 and the up/down counter 329 of FIG. 3 are updated. When the request, wavefront records, and/or information associated with the request and/or the wavefront associated with the requesting ordered instruction of the next oldest expected wavefront is dequeued to proceed for further processing, an identification is made, at step 413, whether additional ordered instructions are expected for this particular wavefront or not. For example, this identification can be made based on an information bit in the ordered instruction. If the identification bit is set, for example, it is determined that this ordered instruction was the last one of ordered instruction for this particular wavefront. However, it is apparent other methods can be used to determine whether more ordered instructions are expected and this disclosure is not limited to this exemplary method.

If it is determined, at step 413, that additional ordered instructions for this particular wavefront are expected, a value of the counter associated with this ordered instruction is incremented at step 415 and the values of all the up/down counters are incremented in step 417. Incrementing the value of the counter associated with the ordered instruction in step 415 enables the counter to point to next slot for a next oldest expected wavefront.

However, if the determination at step 413 determines that the requesting ordered instruction is the last ordered instruction of this particular wavefront, the value of the counter associated with this ordered instruction is incremented in step 419, however, the values of all the up/down counters are incremented in step 421.

The embodiments described above can be described in a hardware description language such as Verilog, RTL, netlists, etc. and that these descriptions can be used to ultimately configure a manufacturing process through the generation of maskworks/photomasks to generate one or more hardware devices embodying aspects of the present invention as described herein.

Embodiments of the present invention yield several advantages over conventional methods of transferring processing outputs to memory. By opportunistically combining data outputs from one or more processing units and address information associated with the data outputs, embodiments of the present invention better utilize the entire communication bandwidth available from the processing units to the memory in order to yield substantially faster transfers of the output data to memory.

The embodiments described above can be described in a hardware description language such as Verilog, RTL, netlists, etc. and that these descriptions can be used to ultimately configure a manufacturing process through the generation of maskworks/photomasks to generate one or more hardware devices embodying aspects of the present invention as described herein.

Embodiments of the present invention yield several advantages over conventional methods of transferring processing outputs to memory. By opportunistically combining data outputs from one or more processing units and address information associated with the data outputs, embodiments of the present invention better utilize the entire communication bandwidth available from the processing units to the memory in order to yield substantially faster transfers of the output data to memory.

While various embodiments of the present invention have been described above, it should be understood that they have been presented by way of example only, and not limitation. It will be understood by those skilled in the relevant art(s) that various changes in form and details may be made therein without departing from the spirit and scope of the present invention as defined in the appended claims. It should be understood that the present invention is not limited to these examples. The present invention is applicable to any elements operating as described herein. Accordingly, the breadth and scope of the present invention should not be limited by any of the above-described exemplary embodiments, but should be defined only in accordance with the following claims and their equivalents.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the present invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An apparatus for the ordered execution in computer parallel processing, comprising:
   a scoreboard structure configured to store a plurality of wavefronts each including a plurality of ordered operations in response to ordered operation requests from one or more processing units; and
   a controller configured to control an order of operations in the plurality of wavefronts supporting an ordering scheme including operations from more than one of the wavefronts, wherein the controller comprises multiple counters such that a counter is associated with a wavefront and identifies the priority of the wavefront and a counter is associated with each operation in a wavefront and identifies the priority of each operation in a wavefront and the order of operations in the plurality of wavefronts is based on the multiple counters and the ordering scheme.

2. The apparatus of claim 1, wherein:
   a respective one of the counters is configured to track a corresponding one of the plurality of ordered operations.

3. The apparatus of claim 1, wherein the controller is further configured to:
   identify a highest or next highest priority wavefront of the plurality of wavefronts according to the ordering scheme;
   identify a highest priority operation of the highest or next highest priority wavefront and process the highest priority operation; and
   increment a value of one of the counters associated with the highest priority operation.

4. The apparatus of claim 3, wherein:
   if additional ordered operations for the highest or next highest priority wavefront are expected, the controller is further configured to increment values of the associated counter; and
   if no additional ordered instructions for the identified wavefront are expected, the controller is further configured to decrement values of the associated counter.

5. The apparatus of claim 1, further comprising:
   one or more processing units configured to parallel process the plurality of wavefronts; and
   an allocator associated with the scoreboard structure to allocate ordered slots in the scoreboard structure for wavefront records;

wherein the controller is configured to receive the information associated with the plurality of wavefronts from the one or more processing units.

6. The apparatus of claim 5, wherein the controller is configured to notify a corresponding one of the one or more processing units when the next one of the plurality of wavefronts to be processed is determined.

7. The apparatus of claim 5, further comprising:
a buffer configured to hold information associated with the next one of the plurality of wavefronts after the next one of the plurality of wavefronts to be processed is determined.

8. The apparatus of claim 7, wherein one or more processing units are configured to retrieve the information associated with the next one of the plurality of wavefronts from the buffer.

9. A method for the ordered execution in computer parallel processing, comprising:
storing a plurality of wavefronts each including a plurality of ordered operations in a scoreboard structure in response to ordered operation requests from one or more processing units; and
controlling an order of operations in the plurality of wavefronts supporting an ordering scheme including operations from more than one of the wavefronts-based on multiple counters and the ordering scheme, wherein a counter is associated with a wavefront and identifies the priority of the wavefront and a counter is associated with each operation in a wavefront and identifies the priority of each operation in a wavefront.

10. The method of claim 9, further comprising:
tracking, using a respective one of the counters, a corresponding one of the plurality of ordered operations.

11. The method of claim 10, further comprising:
identifying a highest or next highest priority wavefront of the plurality of wavefronts according to the ordering scheme;
identifying a highest priority operation of the highest or next highest priority wavefront and processing the highest priority operation; and
incrementing a value of one of the counters associated with the highest priority operation.

12. The method of claim 11, further comprising:
if additional ordered operations for the highest or next highest priority wavefront are expected, incrementing values of the associated counter; and
if no additional ordered operations for the identified wavefront are expected, decrementing values of the associated counter.

13. The method of claim 9, further comprising:
receiving the information associated with the plurality of wavefronts from one or more processing units, the one or more processing units configured to parallel process the plurality of wavefronts.

14. The method of claim 13, further comprising:
notifying a corresponding one of the one or more processing units when the next one of the plurality of wavefronts to be processed is determined.

15. The method of claim 14, further comprising:
holding, in a buffer, information associated with the next one of the plurality of wavefronts after the next one of the plurality of wavefronts to be processed is determined.

16. The method of claim 14, further comprising:
retrieving, by the one or more processing units, the information associated with the next one of the plurality of wavefronts from the buffer.

17. An article of manufacture including a computer-readable non-transitory storage medium having instructions stored thereon, execution of which by a computing device causes the computing device to perform operations comprising:
storing a plurality of wavefronts each including a plurality of ordered operations in response to ordered operation requests from one or more processing units; and
controlling an order of operations in the plurality of wavefronts supporting an ordering scheme including operations from more than one of the wavefronts based on multiple counters and the ordering scheme, wherein a counter is associated with a wavefront and identifies the priority of the wavefront and a counter is associated with each operation in a wavefront and identifies the priority of each operation in a wavefront.

* * * * *